United States Patent [19]
Seekins et al.

[11] Patent Number: 5,937,351
[45] Date of Patent: Aug. 10, 1999

[54] METHOD FOR ESTABLISHING A WIRELESS COMMUNICATIONS LINK IN A REDUCED TIME

[75] Inventors: David S. Seekins, Sunrise; David R. Heeschen, Coconut Creek; Mitchell E. Renko, Coral Springs, all of Fla.

[73] Assignee: Motorola, Inc., Schaumburg, Ill.

[21] Appl. No.: 08/957,277

[22] Filed: Oct. 24, 1997

[51] Int. Cl.$^6$ ................................................ H04Q 7/20
[52] U.S. Cl. .................................... 455/434; 455/432
[58] Field of Search ........................... 455/434, 435, 455/432, 512, 513, 514, 524, 550, 552

[56] References Cited

U.S. PATENT DOCUMENTS

| | | |
|---|---|---|
| 5,499,386 | 3/1996 | Karlsson ................................ 455/444 |
| 5,586,338 | 12/1996 | Lynch et al. ............................ 455/433 |
| 5,629,975 | 5/1997 | Tiedemann, Jr. et al. . |
| 5,669,060 | 9/1997 | Guimont ................................ 455/436 |
| 5,734,980 | 3/1998 | Hooper et al. ......................... 455/432 |
| 5,754,956 | 5/1998 | Abreu et al. ........................... 454/434 |

*Primary Examiner*—Salvatore Cangialosi
*Attorney, Agent, or Firm*—Scott M. Garrett

[57] ABSTRACT

A mobile station (100) maintains a preferred bandmap (106) and a fixed bandmap (104). Upon powering up the mobile station, the mobile station begins scanning frequencies listed in the preferred bandmap. The strength of each detected carrier signal is measured, and the mobile station connect to the serving cell having the strongest carrier signal. The preferred bandmap is maintained by placing the frequency of the most recently connected serving cell at the head of the list, and moving other frequencies down the list as other are added or rotated to the top of the list.

17 Claims, 4 Drawing Sheets

METHOD FOR ESTABLISHING A WIRELESS COMMUNICATIONS LINK IN A REDUCED TIME

TECHNICAL FIELD

This invention relates in general to methods for establishing a communications link between a mobile station and a serving cell, and more particularly to methods of efficiently selecting serving cells to reduce connection time.

BACKGROUND

Many radio communication systems operate using multiple communication sites that serve specific geographical regions. A subscriber unit or mobile subscriber operating within such a system typically undergoes a connection and registration process in order to communicate and register with the system. By connecting it is meant the process of establishing a wireless communications link to facilitate registration, and eventually service. For the system, the connection and registration processes provide such information as the identity, configuration, location, and serving cell for the mobile station. Similarly, for the mobile station, the connection and registration process provides information about the communication environment and associated parameters.

The communication parameters established during the connection and registration process are subject to change over time. For example, after registration, a mobile subscriber unit may change location and require a new serving cell. Additionally, the mobile station may power down or may otherwise be unavailable to participate in communications. Thus, the information gathered during connection and registration may need to be updated based upon certain circumstances. Many prior art systems perform connection and registration as part of a power up sequence, although registration may be performed under a variety of other conditions. U.S. Pat. No. 5,629,975 issued to Tiedemann, Jr. et al. on May 13, 1997 describes power up, zone based, distance based, timer based, ordered, parameter change, and power down registration.

Depending on system design, connection and registration can be a time consuming process. A mobile station may be required to select a serving cell from a group of serving cells, connect with the selected serving cell, transmit communication parameters, and to receive information concerning its environment. While performing these functions, the mobile station is unavailable to a user. It is desirable to minimize the time needed for selecting a serving cell and connecting with the selected serving cell in order to facilitate rapid availability of the mobile station. Therefore, a new approach to establishing a wireless communications link is needed.

DETAILED DESCRIPTION OF THE PREFERRED EMBODIMENT

Figure 1:
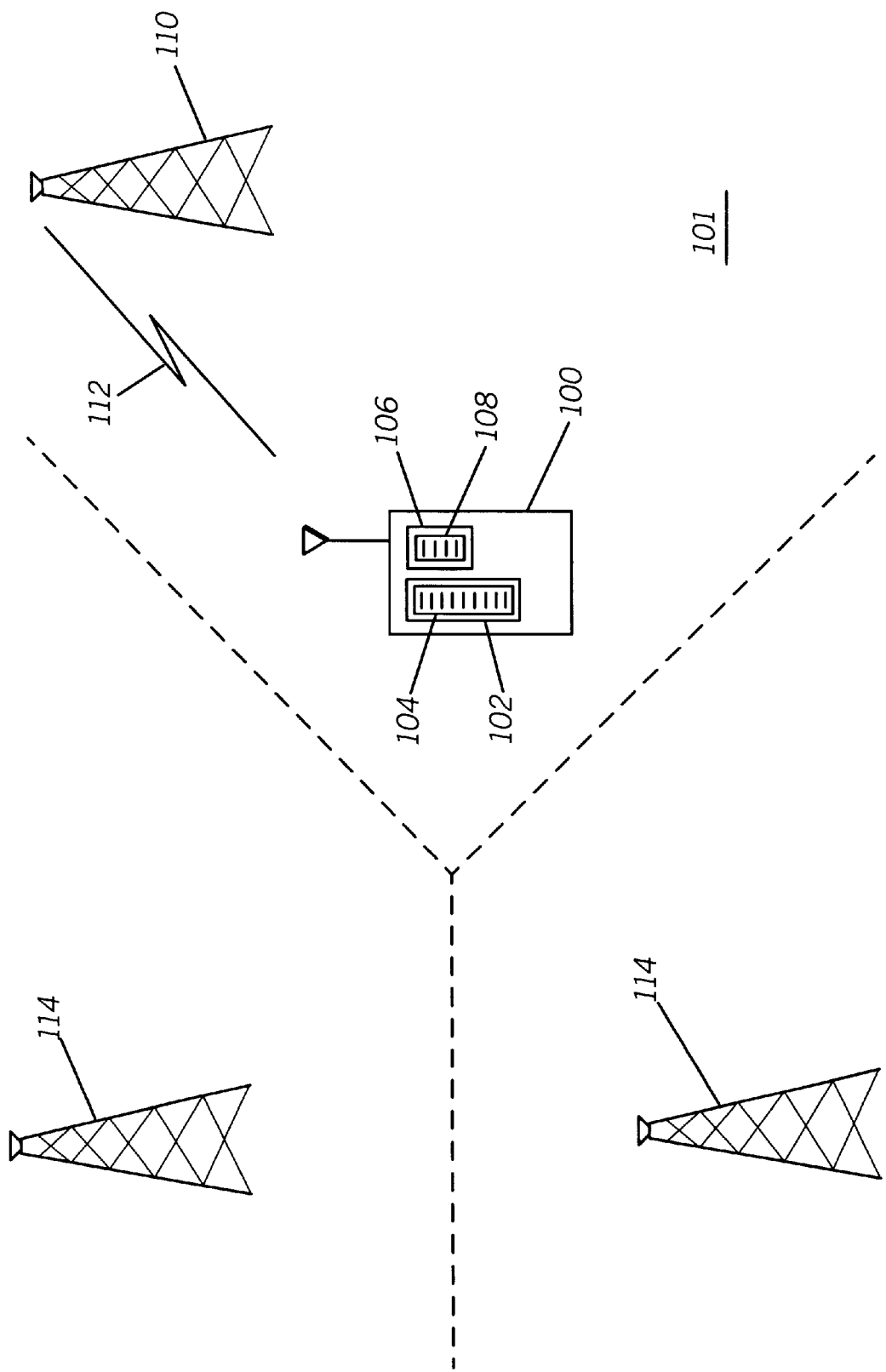
FIG. 1 is a system diagram of a mobile station in a multi-serving cell region.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a system diagram of a mobile subscriber unit or mobile station 100 in a multi-serving cell region, such as a cellular telephone system. The mobile station is in the serving region 101 of a serving cell 110. The mobile station comprises a fixed bandmap 102 having a comprehensive list of serving cell control frequencies 104, and a preferred bandmap 106 having a list of preferred serving cell control frequencies 108. The comprehensive list is a list of all frequencies used as control frequencies by the service provider that are available for initial connection. Some control frequencies are reserved strictly for mobile stations already registered with the system for traffic control purposes. If the system is a time divisioned system, such as time division multiplexed (TDM), or time divisioned multiple access (TDMA) system, then a control channel or control slot may be found at the control frequency. Both the comprehensive and preferred list are maintained in the mobile station in a non-volatile memory. Upon powering up the mobile station, the mobile station attempts establish a communications link with a serving cell 110 over a wireless channel 112. By serving cell it is meant the fixed radio equipment in the local region for providing access to the serving communication network, as is well understood in the art. Prior art systems provide the mobile station with a fixed bandmap only, thus requiring the mobile station to scan through a comprehensive list of frequencies to locate an appropriate serving cell every time the mobile station is powered up. The present invention solves this by additionally providing the mobile station with a preferred bandmap, derived from the fixed bandmap, and comprised of frequencies of the most recently visited serving cell control frequencies, and may include control frequencies of neighboring serving cells 114 of the serving cells most recently visited. In doing so, the time required to connect with the system and receive service is significantly reduced.

Figure 2:
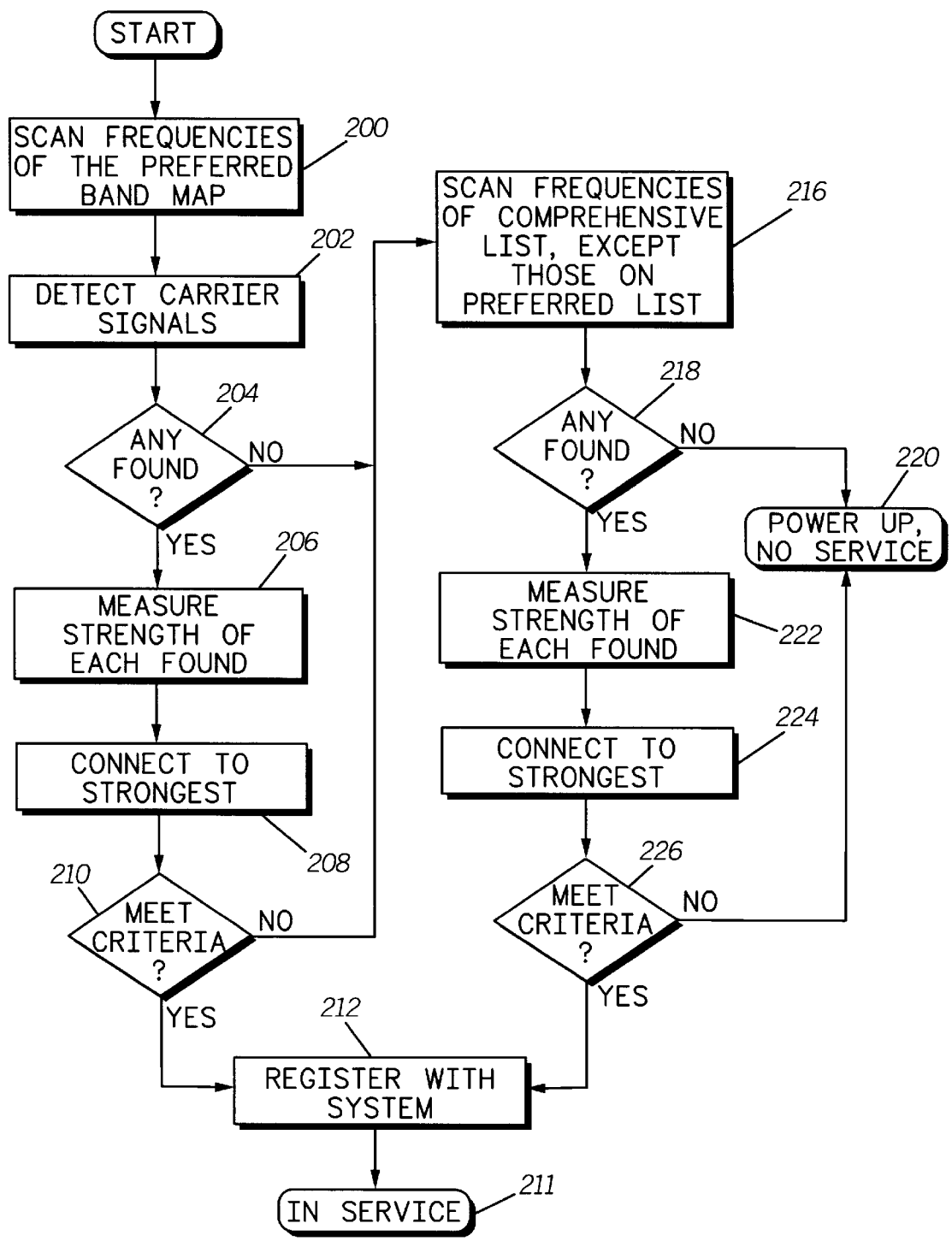
FIG. 2 is a flow chart diagram of a method of establishing a communication link between a mobile station and a serving cell in accordance with the invention.

Referring now to FIG. 2, there is shown a flow chart diagram of a method of establishing a communication link between a mobile station 100 and a serving cell 110 in accordance with the invention. After powering up, the mobile station begins scanning the preferred control frequencies, as listed in the preferred bandmap, as shown in block 200. In the preferred embodiment, the scan is sequential, starting with the first entry on the list of preferred frequencies. The list is maintained in such a way that the frequencies are listed in most recently used order. That is, the first listed frequency is the control frequency of the serving cell to which the mobile station was most recently connected. Thereafter, control frequencies are listed in order according to when they were most recently used.

While scanning the control frequencies, as shown in block 202, the mobile station is trying to detect appropriate carrier signals on the preferred frequencies. This step of detecting is performed by first detecting a threshold of radio frequency energy at the frequency, and then by detecting a control channel at that frequency. The control channel provides synchronization patterns, and broadcasts information about the particular serving cell and the system in general, as is well known in the art.

If at least one control carrier signal is found at a preferred control frequency, as decided in box 204, the mobile station then begins measuring the strength of each carrier found, as in box 206. There are a variety of well known ways of performing this step, such as by using signal quality estimation (SQE) or a received signal strength indicator (RSSI). In the preferred embodiment, the strength is measured a plurality of times and averaged, and in particular, it is measured three times and averaged.

Upon measuring all of the preferred carriers found on the initial scan and detect routine, the mobile station chooses the strongest carrier and performs the step of connecting to the serving cell corresponding with the strongest carrier signal, as shown in block 208. The step of connecting comprises reading the broadcast control information on the control channel on the control frequency, requesting a channel, and establishing a link with the serving cell, as is known in the art.

Upon connecting to the serving cell with the strongest carrier, the mobile station determines if the signal meets a minimum criteria for strength or signal quality, and preferably both, as shown in block 210. In the preferred embodiment, the signal must have an SQE ( [carrier/(noise+interference)]) of at least 20 decibels (dB) and an RSSI of at least −95 dBm. If the signal meets the minimum criteria, then the mobile station proceeds with registering with the serving system, as shown in block 212, in a conventional manner. After successfully registering, the mobile station is ready for service, as indicated by block 214.

If during this process of attempting to find a preferred serving cell, either, as in block 204, no preferred carriers are detected, or, as in block 210, the strongest found preferred carrier does not meet the minimum signal criteria, the mobile station then begins a conventional search for a control carrier by proceeding to block 216. The mobile station proceeds scanning and detecting control frequencies listed on the comprehensive list of the fixed bandmap, excepting frequencies listed in the preferred bandmap, to save time. If once again no carriers are found, as decided in block 218, then the mobile station simply completes powering up and provides a "no service" indication to the user, as in block 220. Then, periodically, the mobile station will repeat the process of searching for a serving cell.

If at least one carrier signal is detected, then, as before, the strength of each carrier is measured, as in block 222. As before, the preferred method involves averaging a plurality of measurements for each carrier signal, and preferably averaging three measurements to obtain a signal strength figure for each carrier signal. Upon completing the step of measuring, the strongest carrier is selected, and the mobile station attempts connecting with the serving cell corresponding to the strongest carrier signal, as in block 224.

Once a link is established with the selected serving cell in a conventional manner, the signal strength and quality are tested against a minimum criteria, as shown in block 226. However, this evaluation differs from that performed in block 210. Here, the minimum criteria is not as high as what is required in block 210. This forces selection of preferred serving cell sites only when they have a better signal than previously non-preferred serving cells. In the preferred embodiment, the signal may now have an SQE as low as 16 dB. If the selected carrier meets or exceeds the criteria, then the mobile station proceeds with registration, as described hereinabove. If the selected carrier does not meet the minimum criteria, then the mobile station proceeds to block 220, and simply completes power up without connecting to a serving cell.

This method of establishing a wireless communications link reduces the amount of time required, on average, to connect to the serving system, since the control frequencies listed in the preferred bandmap are those that have been most recently used. Typically, when the mobile station is powered up, it will be in the serving region of one of its preferred serving cells, thereby eliminating the need to search through all possible control frequencies in most instances. However, it may sometimes be the case that the mobile station is powered up in a serving region in which it has never connected, or at least not recently enough for the control carrier frequencies of the serving cells in the area to be listed in the preferred bandmap. When this occurs, the power up time is not significantly extended beyond that of a conventional power up time because after exhausting the preferred frequencies, the mobile station scans the remaining frequencies of the comprehensive list, but avoids those already scanned. To maximize the effectiveness of the preferred bandmap, the mobile station must maintain it properly.

Figure 3:
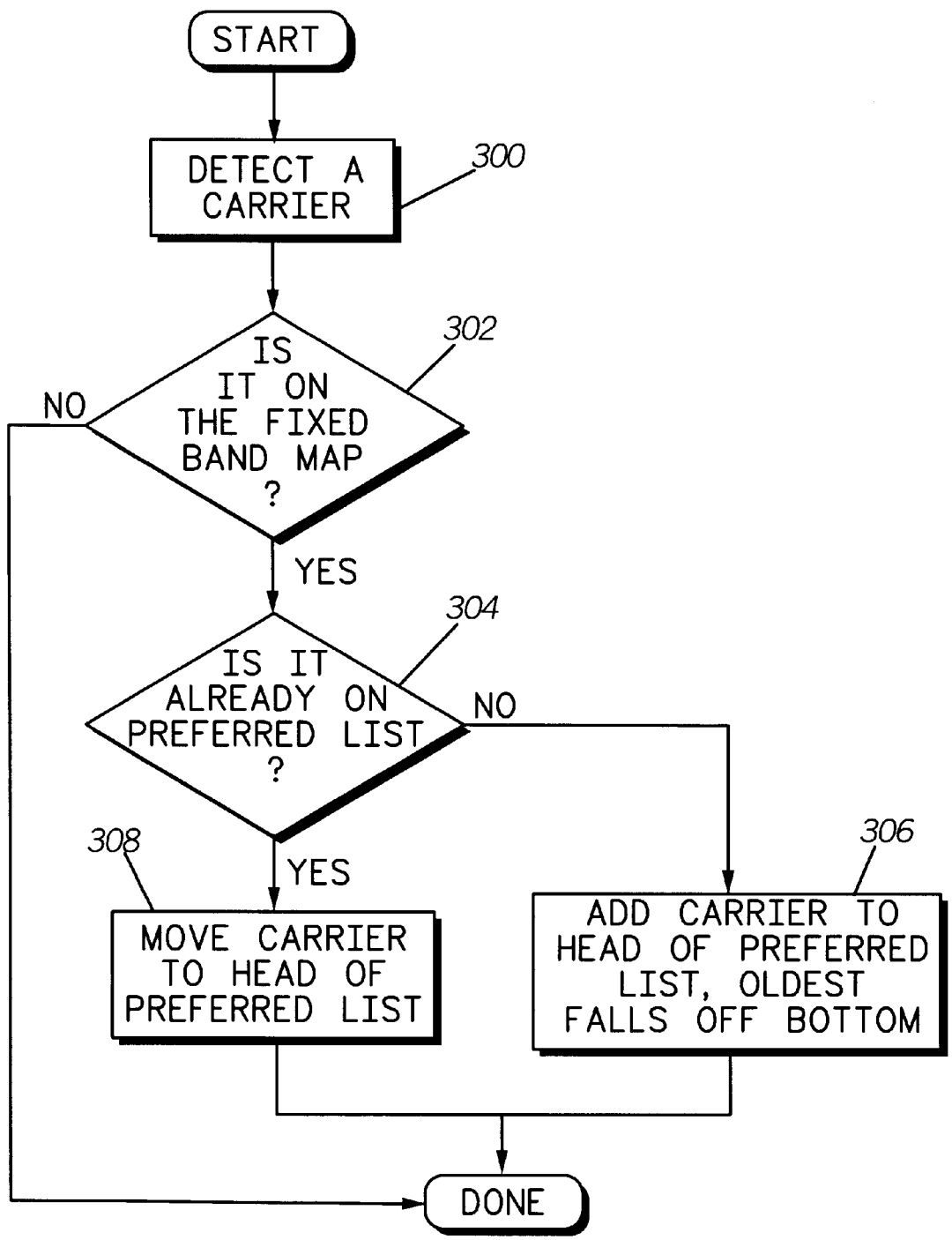
FIG. 3 is a flow chart of a method of revising a preferred bandmap in accordance with the invention.

Referring now to FIG. 3, there is shown a flow chart diagram of a method of revising the preferred bandmap in accordance with the invention. This procedure is entered into whenever the mobile station connects to a new serving cell, after the power up procedure of FIG. 2. When this occurs, the control frequency of the new cell is verified against the fixed bandmap to ensure it is an allowable start up serving cell. Once it has been determined that the carrier is an appropriate signal, having the necessary control channel, then the mobile station checks to see if the frequency of the carrier is listed on the fixed bandmap's comprehensive list, as shown in block 302. If the frequency is a valid control frequency, the mobile station examines the preferred bandmap to see if the frequency is listed on the preferred list, as decided in block 304. If so, then, as shown in block 308, the frequency is moved to the head of the list, and all of the frequencies listed above it are moved down one position. If the detected carrier signal frequency is not on the list of preferred control frequencies, then all entries on the list are moved down one position, if the list is full then the lowest entry is removed, and the detected carrier signal frequency is added at the head of the preferred list, as in block 306. In this way the first entry is the most recently used control frequency and the last entry is the oldest control frequency.

In the preferred embodiment, the preferred list is maintained at a preselected length which is shorter than the comprehensive list of the fixed bandmap. In particular, the preferred list is kept to a length equal to the theoretical maximum number of serving cells the mobile station could detect, which in the preferred embodiment is 28. However, in practice, it is unlikely that the mobile station will detect so many control frequencies during power up. Therefore, a method of generating the preferred bandmap is required.

Figure 4:
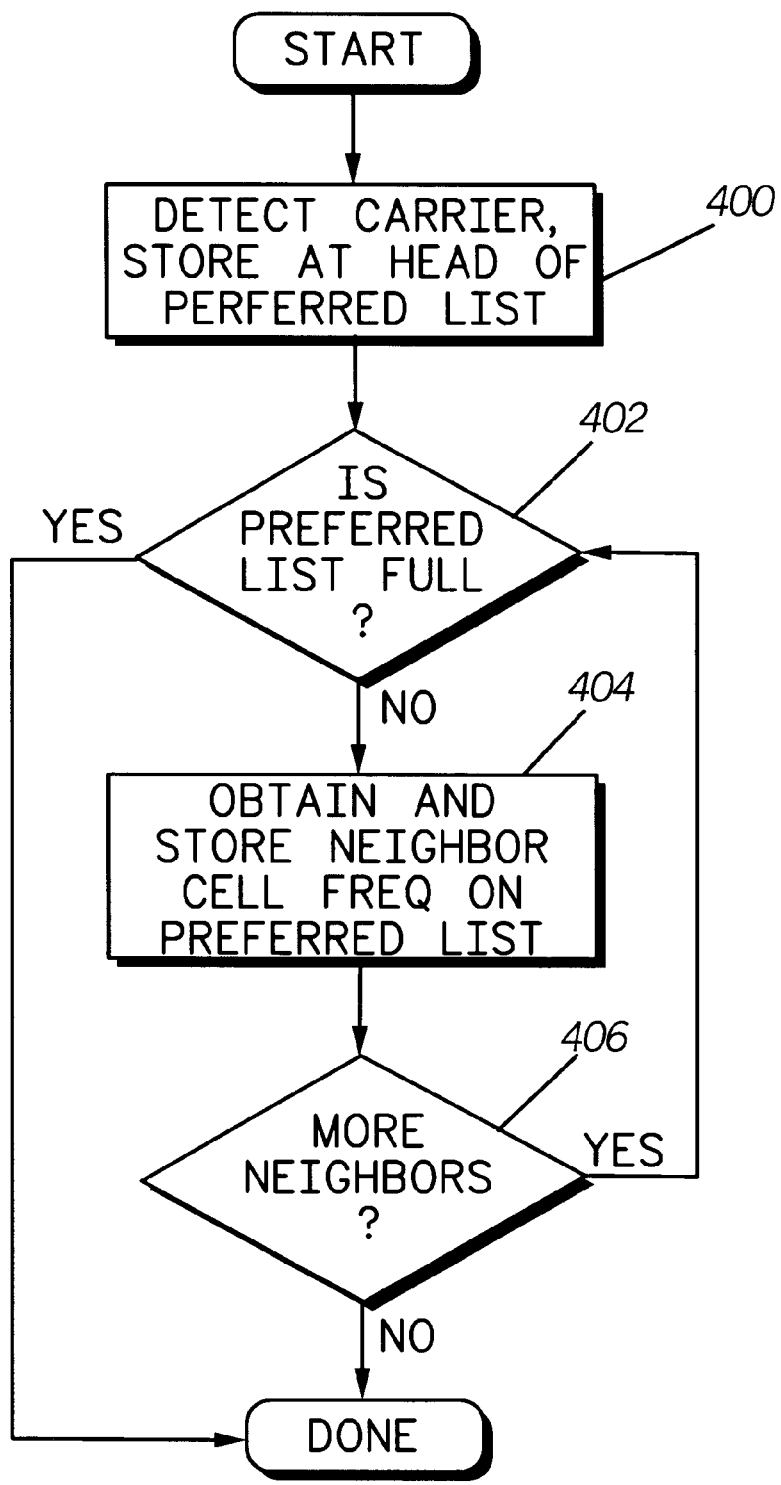
FIG. 4 is a flow chart diagram of a method of generating a preferred bandmap in accordance with the invention.

Referring now to FIG. 4, there is shown a flow chart diagram of a method of generating a preferred bandmap in accordance with the invention. This method is generally performed to seed the preferred bandmap, as when the mobile station is powered up for the first time. In general, as with the previously described methods hereinabove, this method begins when an appropriate carrier is detected, in block 400. However, as the preferred list is being initialized, the frequency of the detected carrier is immediately stored at the head of the preferred list. Then the mobile station enters into a loop beginning checking to see if the preferred list is full, in block 402. If the list is full, then the procedure is terminated. However, during initialization, in practice, it is unlikely that the preferred list will be filled. As such, the mobile station proceeds to block 404, and begins obtaining a neighboring cell frequency of a neighboring cell from the detected serving cell. The mobile station then performs the step of storing the neighboring cell frequency in the preferred list, preferably subsequent on the list to the frequency of the detected serving cell. In block 406 the mobile station checks to see if more neighboring cells are present. If no more are found, then the method is terminated. If there are other neighboring cells, the method is partially repeated by returning to block 402 and checking to see if the preferred list is full, and proceeding accordingly.

By providing and maintaining a preferred list as disclosed, the time required by the mobile station to establish service will be reduced over conventional methods. For the method to be effective, the preferred bandmap must be dynamically maintained, and organized hierarchically by most recently visited serving cell. This is effective since the mobile station is usually operated in a given number of serving cells, all of which can be indicated in the preferred bandmap. Upon powering up the mobile station, the mobile station begins scanning the preferred control frequencies listed in the preferred bandmap in a preselected order, which in the preferred embodiment, is from the most recently visited serving cell control frequency to the oldest. However, at times when none of the preferred serving cell frequencies are found, as may happen when a mobile station travels out of its typical serving area, the time required to establish service is not significantly longer than is conventional since only the remaining frequencies of the fixed bandmap are scanned.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method to be performed by a mobile station for establishing a wireless communications link between the mobile station and a serving cell, the method comprising the steps of:

scanning a list of preferred serving cell control frequencies as listed in a preferred bandmap, the preferred bandmap having been derived from a fixed bandmap, the fixed bandmap having a comprehensive list of serving cell control frequencies, both the fixed bandmap and preferred bandmap disposed in the mobile station;

detecting at least one appropriate carrier signal on at least one of the preferred serving cell frequencies while performing the step of scanning;

measuring a signal strength of each of the at least one appropriate carrier signals to determine a strongest carrier signal; and connecting to a serving cell corresponding with the strongest carrier signal.

2. A method for establishing a wireless communications link as defined in claim 1, wherein the step of detecting comprises detecting a threshold radio frequency energy level.

3. A method for establishing a wireless communications link as defined in claim 2, wherein the step of detecting further comprises detecting a control channel.

4. A method for establishing a wireless communications link as defined in claim 1, further comprising the step of measuring a signal quality of strongest carrier signal, and if the signal quality meets a minimum criteria, registering with a service provider through the serving cell.

5. A method for establishing a wireless communications link as defined in claim 4, wherein if the signal quality of the strongest carrier signal does not meet the minimum criteria, the method further comprising the steps of:

scanning the list of serving cell frequencies of the fixed bandmap, excepting the preferred frequencies;

detecting at least one appropriate carrier signal on at least one of the serving cell frequencies while performing the step of scanning;

measuring a signal strength of each of the at least one appropriate carrier signals to determine a strongest carrier signal; and connecting to a serving cell corresponding with the strongest carrier signal.

6. A method for establishing a wireless communications link as defined in claim 1, wherein the step of measuring comprises averaging a plurality of signal strength measurements for each of each of the at least one appropriate carrier signals.

7. A method for establishing a wireless communications link as defined in claim 6, wherein exactly three signal strength measurements are averaged.

8. A method for establishing a wireless communications link as defined in claim 1, wherein the step of scanning the preferred frequencies comprises scanning the preferred frequencies in a preselected order.

9. A method for establishing a wireless communications link as defined in claim 8, wherein the step of scanning in a preselected order comprises scanning successively from a most recently used frequency to an oldest frequency.

10. A method of revising a preferred bandmap from a fixed bandmap in a mobile station, the preferred bandmap comprising a list of preferred frequencies, the fixed bandmap comprising a comprehensive list of serving cell frequencies, the method comprising the steps of:

detecting an appropriate carrier signal as a detected carrier signal, performed by a mobile station;

verifying a frequency of the detected carrier signal against the fixed bandmap; and storing the frequency of the detected carrier in the preferred bandmap if the frequency of the detected carrier is not stored in the preferred bandmap.

11. A method of revising a preferred bandmap as described in claim 10, wherein the step of detecting comprises detecting a control channel.

12. A method of revising a preferred bandmap as described in claim 10, wherein the step of storing comprises:

moving the list of preferred frequencies down the preferred bandmap; and storing the frequency of the detected carrier to a head of the list of preferred frequencies.

13. A method of revising a preferred bandmap as described in claim 10, further comprising the step of maintaining a length of the list of preferred frequencies at a preselected length.

14. A method of revising a preferred bandmap as described in claim 13, wherein the step of maintaining comprises maintaining the length of the list of preferred frequencies to 28 frequencies.

15. A method of generating a preferred bandmap in a mobile station from a fixed bandmap, the preferred bandmap being initially empty, the fixed bandmap having a comprehensive list of serving cell frequencies, the method of generating comprising the steps of:

scanning the serving cell frequencies;

detecting an appropriate carrier signal from a detected serving cell at a scanned frequency;

storing the scanned frequency at a head of the preferred bandmap;

obtaining a neighboring cell frequency of a neighboring serving cell from the detected serving cell; and storing the neighboring cell frequency in the preferred bandmap.

16. A method of generating a preferred bandmap as defined in claim 15, wherein the steps of obtaining a neighboring cell frequency and storing the neighboring cell frequency are repeated until either the preferred bandmap reaches a predetermined length or a complete set of neighboring cell frequencies has been stored in the preferred bandmap.

17. A method of generating a preferred bandmap as described in claim 15, wherein the step of detecting comprises detecting a control channel.

* * * * *